(12) United States Patent
Sola Gomfaus et al.

(10) Patent No.: US 10,308,165 B2
(45) Date of Patent: Jun. 4, 2019

(54) METHOD AND DEVICE FOR CONTROLLING THE LIGHT EMISSION OF A REAR LIGHT OF A VEHICLE

(71) Applicant: Volkswagen Aktiengesellschaft, Wolfsburg (DE)

(72) Inventors: Andreu Sola Gomfaus, Wolfsburg (DE); Michael Werner, Braunschweig (DE); Michael Mueller, Gifhorn (DE); Mathias Thamm, Oebisfelde (DE); Daniel Mensch, Wolfsburg (DE); Henning Kiel, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 395 days.

(21) Appl. No.: 14/976,888

(22) Filed: Dec. 21, 2015

(65) Prior Publication Data

US 2016/0107564 A1    Apr. 21, 2016

Related U.S. Application Data

(63) Continuation of application No. PCT/EP2014/061300, filed on Jun. 2, 2014.

(30) Foreign Application Priority Data

Jun. 20, 2013    (DE) ........................ 10 2013 010 333

(51) Int. Cl.
*B60Q 1/00*    (2006.01)
*H05B 33/08*   (2006.01)
(Continued)

(52) U.S. Cl.
CPC .......... *B60Q 1/0076* (2013.01); *B60Q 1/0011* (2013.01); *B60Q 1/2607* (2013.01);
(Continued)

(58) Field of Classification Search
CPC ........ B60Q 2300/112; B60Q 2300/054; B60Q 1/143; B60Q 1/34; B60Q 1/343;
(Continued)

(56) References Cited

U.S. PATENT DOCUMENTS 5,457,439 A    10/1995    Kuhn
5,463,370 A    10/1995    Ishikawa et al.
(Continued)

FOREIGN PATENT DOCUMENTS

CN    100519269 C    7/2009
DE    2 012 484 A1   9/1971
(Continued)

OTHER PUBLICATIONS

English machine translation of German Patent DE 19945775 B4.*
(Continued)

*Primary Examiner* — Jimmy T Vu
(74) *Attorney, Agent, or Firm* — Muncy, Geissler, Olds & Lowe, P.C.

(57)    ABSTRACT

A method and device for controlling a light emission of a rear lamp of a vehicle. The rear lamp includes optical components having emission surfaces having at least three partial emission surfaces. At least a first and a second light function can be produced by the light emission of the emission surfaces. After a switchover process from the first to the second light function, the first partial emission surface, which emits light for the first light function, emits no light, the second partial emission surface, which emits light for the first light function, continues to emit light, and the third partial emission surface, which emits no light for the first light function, emits light.

13 Claims, 7 Drawing Sheets

(51) Int. Cl.
*B60Q 1/26* (2006.01)
*B60Q 1/44* (2006.01)
*B60Q 1/34* (2006.01)
*B60Q 1/46* (2006.01)

(52) U.S. Cl.
CPC ............... *B60Q 1/34* (2013.01); *B60Q 1/444* (2013.01); *B60Q 1/46* (2013.01)

(58) Field of Classification Search
CPC .............. B60Q 1/346; B60Q 1/44–448; B60Q 1/0076; B60Q 1/0011; B60Q 1/2607; B60Q 1/444; B60Q 1/46; H05B 37/02; H05B 33/08; H05B 33/0842
USPC ..... 315/79, 77; 362/276, 540–545; 340/466, 340/441, 464
See application file for complete search history.

(56) References Cited

U.S. PATENT DOCUMENTS

| | | | |
|---|---|---|---|
| 5,610,578 A * | 3/1997 | Gilmore | ................. B60Q 1/302 307/10.8 |
| 6,100,799 A | 8/2000 | Fenk | |
| 7,019,632 B2 | 3/2006 | Cole | |
| 7,270,455 B2 | 9/2007 | Befelein | |
| 7,573,378 B2 * | 8/2009 | Matsumoto | ............ B60Q 1/444 340/467 |
| 2008/0011673 A1 | 1/2008 | Janikowski et al. | |
| 2008/0094200 A1 | 4/2008 | Matsumoto et al. | |
| 2011/0304455 A1 | 12/2011 | Kisiel | |

FOREIGN PATENT DOCUMENTS

| | | | |
|---|---|---|---|
| DE | 35 16 118 A1 | 11/1986 | |
| DE | 37 24 255 A1 | 2/1989 | |
| DE | 43 17 831 C1 | 7/1994 | |
| DE | 196 05 813 A1 | 8/1996 | |
| DE | 196 24 046 | 12/1997 | |
| DE | 197 38 767 A1 | 3/1999 | |
| DE | 198 45 679 A1 | 4/2000 | |
| DE | 100 49 123 A1 | 4/2001 | |
| DE | 199 45 775 A1 | 4/2001 | |
| DE | 19945775 A1 * | 4/2001 | ............... B60Q 1/20 |
| DE | 100 05 499 A1 | 8/2001 | |
| DE | 101 30 259 A1 | 1/2003 | |
| DE | 101 47 825 A1 | 4/2003 | |
| DE | 103 02 460 A1 | 8/2004 | |
| DE | 10 2006 046 170 A1 | 4/2008 | |
| EP | 0 813 996 B1 | 7/2002 | |
| EP | 1 892 147 A1 | 2/2008 | |
| FR | 2 659 610 A1 | 9/1991 | |
| GB | 2 427 019 A | 12/2006 | |
| KR | 10-2002-0022879 A | 3/2002 | |
| KR | 10-2004-038293 A | 5/2004 | |
| KR | 10-2008-0012182 A | 11/2008 | |
| WO | WO 02/38415 A1 | 5/2002 | |
| WO | WO 2004/106113 A1 | 12/2004 | |
| WO | WO 2009/093788 A1 | 7/2009 | |
| WO | WO 2009093788 A1 * | 7/2009 | ............ B60Q 1/441 |
| WO | WO 2011/061617 A1 | 5/2011 | |

OTHER PUBLICATIONS

Korean Office Action for Korean Application No. 10-2016-7000253 dated Feb. 6, 2017 with English translation.
Chinese Office Action for Chinese Application No. 201480035330.2 dated Sep. 7, 2016 with English translation.

* cited by examiner

METHOD AND DEVICE FOR CONTROLLING THE LIGHT EMISSION OF A REAR LIGHT OF A VEHICLE

This nonprovisional application is a continuation of International Application No. PCT/EP2014/061300, which was filed on Jun. 2, 2014, and which claims priority to German Patent Application No. 10 2013 010 333.9, which was filed in Germany on Jun. 20, 2013, and which are both herein incorporated by reference.

BACKGROUND OF THE INVENTION

Field of the Invention

The present invention relates to a method for controlling a light emission of a rear light of a vehicle, whereby the rear light comprises optical components having emitting surfaces with at least three partial emitting surfaces and whereby at least a first and a second light function can be generated via the light emission of the emitting surfaces. Further, the invention relates to a device for controlling the light emission of a rear light of a vehicle.

Description of the Background Art

A problem arises in the redesigning of vehicles that because of the desired aerodynamics and the desired design, the installation space conditions for lighting equipment, particularly for rear lights, headlights, and reflectors, are very limited dimensionally. The signal effect of a light, however, is determined by the size of the emitting surface and by the light density. Furthermore, the vehicle lighting equipment contributes greatly to the vehicle design. The design of the lighting equipment is often intended to give the vehicle a characteristic appearance that is easy to recognize. Further, the problem arises that the cost of the production of the lights is to be as low as possible.

DE 196 05 813 A1 discloses an indicator lamp array that provides signals dependent on the vehicle's operating state. In this case, additional light emitting areas, which light up at a specific braking strength, are mounted on the back of the vehicle at increasingly greater distances to the ground.

DE 100 05 499 A1 describes a device for indicating different levels of the braking force for vehicles of all types. In this case, the illuminated area is the larger, the greater the braking force.

Furthermore, WO 2009/093788 A1 discloses a brake light, which allows the driver of a following vehicle to recognize the degree of speed reduction of the preceding vehicle according to the magnitude of the braking force. Horizontal rows of light sources are turned on as the brake light as the braking force increases.

In addition, DE 10 2006 046 170 A1 describes a light unit with light sources in a matrix-like arrangement. The light surface area of the light unit can be changed in this case by the turning on and off of rows of the light source matrix.

EP 0 813 996 B1, which corresponds to U.S. Pat. No. 6,100,799, describes a method for indicating the braking strength or deceleration of a vehicle. In this case, the main illumination points of a lit area assigned to a brake light move apart as the braking strength increases.

Further, DE 198 45 679 A1 discloses a lighting system for motor vehicles with at least one brake light, whereby the brake light provides different light signals depending on the braking strength.

DE 20 12 484 A1 describes a braking device formed as a multi-stage braking system. The brake light of the braking device is divided into three chambers. First one, then two, and finally three chambers are illuminated with an increasing brightness.

Finally, DE 35 16 118 A1 describes a device for indicating braking with a plurality of brake lights, arranged next to one another. These are turned on increasingly depending on the brake actuation force exerted on a pressure sensor.

SUMMARY OF THE INVENTION

It is therefore an object of the present invention to provide a method and a device that enable a high signal effect of a rear light of a vehicle, whereby the vehicle's installation space is optimally utilized.

The method of the invention provides in an exemplary embodiment that after a switchover process from the first to the second light function, the first partial emitting surface, which emits light for the first light function, no longer emits light, the second light emitting surface, which emits light for the first light function, continues to emit light, and the third partial emitting surface, which does not emit light for the first light function, emits light. The signal effect is advantageously increased by the method of the invention in that part of a first light function is turned off and a partial emitting surface, not illuminated during the first light function, is illuminated. As a result, on the one hand, a switchover to a second light function receives more attention subconsciously. On the other hand, an association can be created between the two light functions, because a partial emitting surface is illuminated in both light functions.

The partial emitting surfaces can be formed, for example, in the shape of lines, whereby the lines of the first and second partial emitting surfaces are perpendicular to the third partial emitting surface. As a result, a special design can be imparted to the rear light. The emitting surfaces can merge thereby. They can also be arranged separated from one another, therefore not in contact with one another. Advantageously the vehicle is then provided with a high recognition value.

Substantially horizontal light lines can be produced by the first and second partial emitting surface. Substantially, a vertical light line is then produced by the third partial emitting surface. This can, e.g., include a plurality of light sources being arranged next to one another or below one another and horizontal or vertical light lines being produced in this way. The term 'substantially' can convey that the light lines need not run completely horizontally or vertically. Sections of the horizontal lines can also run diagonally or vertically, and sections of the vertical lines can run diagonally or horizontally. This as well results in a high vehicle recognition value because of a unique design. The signal effect is also especially high because a change in the shape of the illuminated emitting surfaces is especially striking by a 90° change in direction. In particular at least the horizontal light lines produced by the first partial emitting surface are produced by lower emitting surfaces, arranged next to one another, and/or the vertical light line of the third partial emitting surface is produced by lower emitting surfaces, arranged below one another. A plurality of lower emitting surfaces can also be arranged, whereby at least two emitting surfaces of the plurality of emitting surfaces can form the first, second, and/or third partial emitting surface. For example, the emitting surfaces are arranged in the shape of a matrix in rows and columns. Vertical light lines can then be produced by the light emission from columns of the emitting surfaces arranged in a matrix shape and horizontal light lines from rows of the emitting surfaces arranged in a matrix shape. Advantageously, a plurality of signatures for various vehicle functions can be generated in a simple manner by any combinations of emitting surfaces.

In an embodiment of the method of the invention, the first partial emitting surface can be produced by a first set of lower emitting surfaces and the third partial emitting surface can be produced by a second set of lower emitting surfaces. In this regard, at least one lower emitting surface is a subset of the first and second set of lower emitting surfaces. This means that the first and second partial emitting surface can be produced at least partially by the same lower emitting surfaces. Lower emitting surfaces that belong to only one of the two sets are then turned on or off during the switchover process.

Three light lines can be produced by at least one part of the second partial emitting surface, whereby the three light lines can be arranged such that the at least one part of the second partial emitting surface produces a u-shaped light emission. In this regard, the orientation of the u-shape can be arbitrary. The u-shape can be open at the top, bottom, on the side, or a combination of at the top, bottom, or on the side. In this case, the u-shaped light emission enables a high vehicle recognition value.

According to an embodiment of the method of the invention, the switchover process is carried out as a function of a signal, and the intensity of the light emission by the second partial emitting surface is increased as a function of the signal, whereby the intensity of the light emission is precisely as great as the intensity of the light emission by the third partial emitting surface. This combines a possible change in the shape of the illuminated emitting surfaces with an increased intensity of the light emission. This results advantageously in an especially high signal effect.

The signal can be assigned, for example, to a vehicle deceleration caused by a braking action, whereby the first light function is a taillight function and the second light function a braking light function.

According to an embodiment of the method of the invention, the third partial emitting surface can comprise at least two lower emitting surfaces. Furthermore, the second light function can be divided into two levels as a function of the signal. When the first level is reached, the second light function is generated by the second partial emitting surface and the first lower emitting surface of the third partial emitting surface. When the second level is reached, the second light function can be generated in addition by the second lower emitting surface of the third partial emitting surface, so that the second light function is generated jointly by the second partial emitting surface and the first and second lower emitting surface of the third partial emitting surface. This has the result that the signal effect of the brake light is divided into different danger levels. Depending on the braking strength, drivers of following vehicles can assess how great the danger is due to which the braking has occurred. They can advantageously quickly assess whether the braking action is a normal braking action or emergency braking and act accordingly.

The second light function can be divided into three levels as a function of the deceleration, whereby when the third level is reached the optical components are controlled such that a pulsating light is emitted by the second partial emitting surface and by the first and second lower emitting surface of the third partial emitting surface and/or a hazard warning light function of the vehicle is turned on. It is assured in this embodiment that upon emergency braking, the brake light has an especially high signal effect.

The invention relates furthermore to a device for controlling a rear light of a vehicle, whereby the rear light comprises optical components having emitting surfaces with at least three partial emitting surfaces and whereby at least a first and a second light function can be generated by means of the light emission of the emitting surfaces. The device comprises a control device by means of which the light emission by the partial emitting surfaces can be controlled. The device is characterized in that the optical components can be controlled by means of the control device such that after a switchover process from the first to the second light function, the first partial emitting surface, which emits light for the first light function, no longer emits light, the second partial light emitting surface, which emits light for the first light function, continues to emit light, and the third partial emitting surface, which does not emit light for the first light function, emits light. The device is designed in particular to carry out the method of the invention and therefore has all the advantages of the method.

According to one embodiment of the device of the invention, the optical components comprise light emitting diodes (LEDs). In comparison with conventionally employed light sources such as, for example, incandescent lamps, LEDs have a longer lifetime and a better energy efficiency, which is reflected in reduced maintenance costs. In addition, the use of LEDs in the brake light is especially advantageous, because they respond more quickly than conventionally used light sources. The following road users are therefore alerted more quickly to a situation that requires a braking reaction.

The invention relates furthermore to a vehicle having a device of this type.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
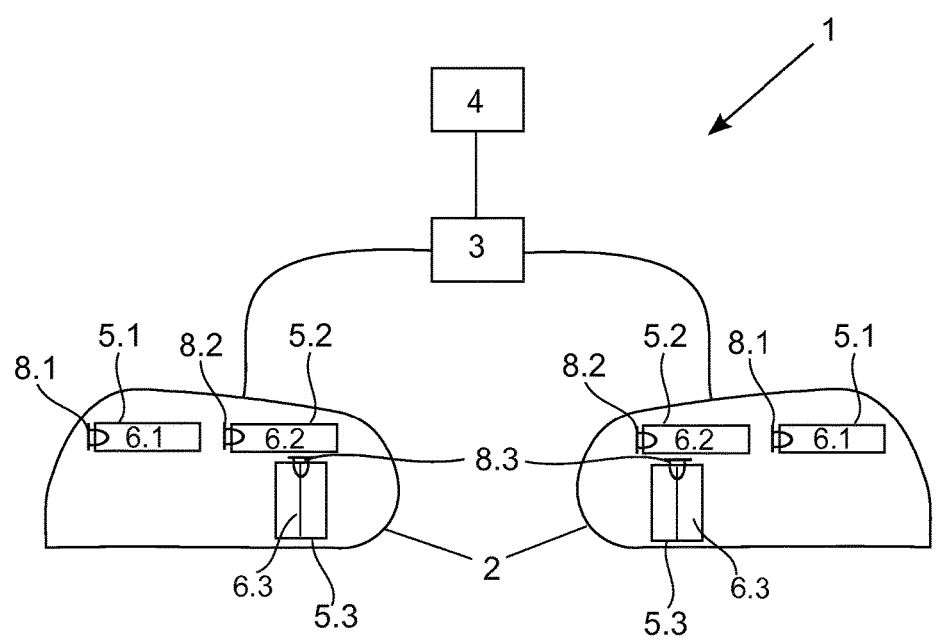
FIG. 1 shows an exemplary embodiment of a device of the invention.

An exemplary embodiment of device 1 of the invention is described with reference to FIG. 1.

Device 1 of the invention comprises two rear lights 2, which in turn comprise a plurality of optical components 5 and 8. Optical components 5 and 8 comprise optical fibers 5 and LEDs 8. LEDs 8 couple light into optical fibers 5. The decoupling surfaces of optical fibers 5 function as emitting surfaces 6 of rear lights 2. Emitting surface 6 is divided into three partial emitting surfaces 6.1, 6.2, and 6.3. Optical components 5 are arranged furthermore so that partial emitting surfaces 6.1 and 6.2 of optical fibers 5.1 and 5.2 emit light as horizontal lines. Partial emitting surface 6.3, in contrast, is arranged so that it emits light as a vertical line. Partial emitting surfaces 6.1 and 6.2 are therefore perpendicular to partial emitting surface 6.3. Partial emitting surfaces 6.1, 6.2, and 6.3 further are arranged separately from one another; therefore they are not in contact.

Rear light 2 generates as a first light function a taillight function and as the second light function a brake light function. The taillight function in this case is generated by optical components 5.1, 8.1, 5.2, and 8.2. The brake light function is generated by optical components 5.2, 8.2, 5.3, and 8.3. The free area below partial emitting surface 6.1 can be occupied by other light functions. For example, a turn signal or a rear fog light can be mounted there.

Furthermore, device 1 comprises a signal generating device 4. This is a brake pedal in the specific exemplary embodiment. When brake pedal 4 is actuated, a signal is generated which brings about a switchover process from a taillight function to a brake light function. Brake pedal 4 is connected via a control device 3 to rear lights 2. Optical components 8 of rear lights 2 are therefore controlled by control device 3 as a function of the signal generated via brake pedal 4.

Figure 2:
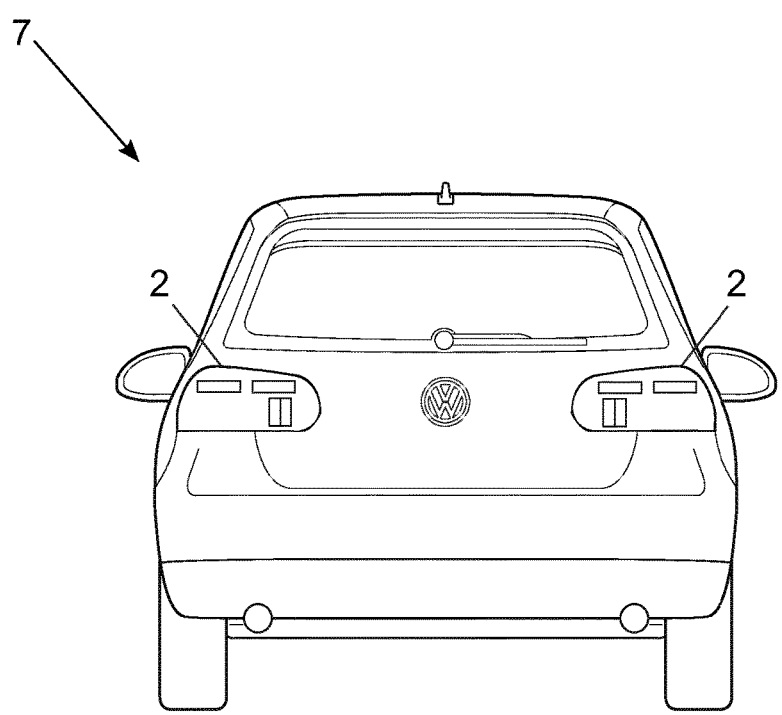
FIG. 2 shows a rear view of a vehicle with the device 1 of the invention shown in FIG. 1.

FIG. 2 shows a vehicle 7 with a device 1 of the invention from the rear view. It becomes clear here that device 1 of the invention allows a special design of rear light 2.

Figure 3A:
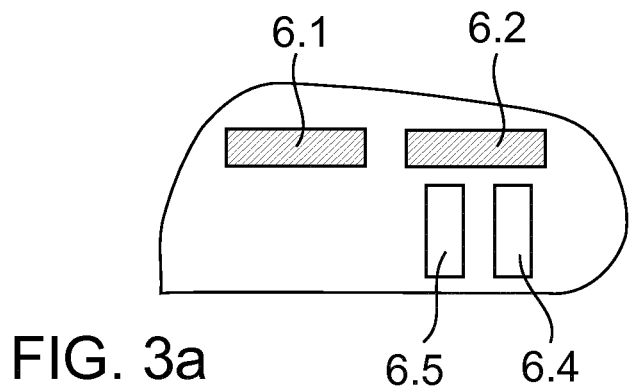
FIGS. 3a to 3c show signatures of the rear lights in different braking levels.

FIG. 3*a* shows a slightly modified embodiment of rear light 2. In this case, partial emitting surface 6.3 is again divided into two lower emitting surfaces 6.4 and 6.5 arranged separately from one another.

Figure 3B:
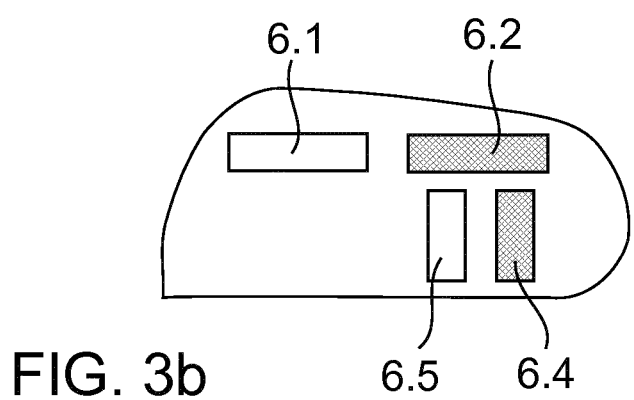

A first exemplary embodiment of the method of the invention is described with reference to FIGS. 3 and 4. In this regard, for the first exemplary embodiment the two lower emitting surfaces are seen as a partial emitting surface 6.3. The hatching in FIGS. 3*a*, 3*b*, and 3*c* indicates illuminated partial emitting surfaces 6. The denser hatching in FIGS. 3*b* and 3*c* denotes a greater light intensity.

At the start of process 10 in process step 11, partial emitting surfaces 6.1 and 6.2 are illuminated as the taillight function of vehicle 7, as shown in FIG. 3*a*.

If the driver of vehicle 7 steps on brake pedal 4, then a signal is generated in step 12. In step 13, the signal generated in step 12 is sent to control device 3, which in step 14 then in turn controls optical components 8 of rear lights 2. In the case of method 10, LED 8.1, which couples light into optical fiber 5.1, is turned off. Partial emitting surface 6.1, which originally had generated a part of the taillight function, accordingly no longer emits light outwardly. At the same time, LED 8.3, which couples light into optical fibers 5.3, is turned on. In so doing, the intensity of LED 8.3 is set higher than the intensity of LEDs 8.1 and 8.2, when they provide a taillight function. The intensity of LED 8.2, which couples light into optical fiber 5.2, is increased simultaneously. As a result, partial emitting surface 6.2 is illuminated more brightly as part of the brake light function than as part of the taillight function. The signature of rear light 2 in the case of an activated brake light is shown in FIG. 3*b* or 3*c*.

If the driver of vehicle 7 removes his foot from brake pedal 4, the starting light distribution of FIG. 3*a* is restored and the process begins again in step 11.

Method 10 represents the simplest variant of the method of the invention.

Figure 5:
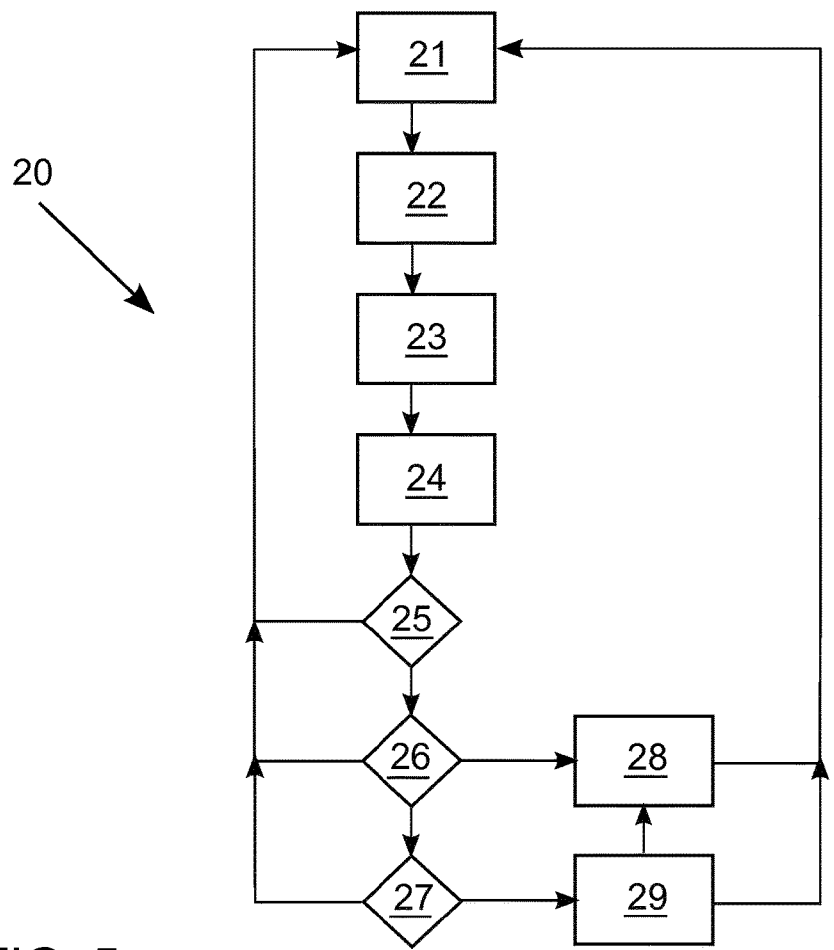
FIG. 5 shows a diagram of a process in an exemplary embodiment of the method of the invention.

Another exemplary embodiment of the method of the invention will be described with reference to FIGS. 3 and 5. In this case, this involves a three-level brake light.

Step 21 here is equivalent to step 11 of method 10.

In step 22 stepping on brake pedal 4 generates a signal, which is associated with the deceleration of vehicle 7. In this case, two deceleration values are established at which a next brake light level is turned on. In this regard, the first level is assigned a first deceleration value, for example, the value of 3 m/s$^2$. Level one is then active until this deceleration value is exceeded. Then level two is activated, which is likewise assigned a deceleration value that is higher than the first deceleration value, for example, the value of 6 m/s$^2$. Level two in turn is active until the second deceleration value is exceeded. Then level three is activated. The deceleration values at which the different levels are to be activated are stored in control device 3. Control device 3 controls the various LEDs 8 by means of pulse width modulation.

The deceleration of vehicle 7 is detected in step 23. In step 24 control device 3 compares the detected deceleration value with the stored deceleration value.

In step 25, control device 3 controls LEDs 8 such that LED 8.1 is turned off, whereas LED 8.4 is turned on. In this case, the intensity of LED 8.4 is adjusted such that it is greater than the intensity of LEDs 8.1 and 8.2 during operation of the taillight function. Furthermore, the intensity of LED 8.2 is increased to the value of LED 8.4. The signature of rear light 2 in this step can be seen in FIG. 3*b*.

After step 25, depending on the driver's behavior the method is continued either with step 21 or with step 26.

If the braking action is only a light, short braking, i.e., the driver takes his foot again off the brake, then vehicle 7 no longer experiences a deceleration caused by the braking force. The taillight function from step 21 is restored. As a result, a driver of a following vehicle is signaled that the reason for the instituted braking action no longer exists.

If the driver of vehicle 7 during the braking action steps more heavily on brake pedal 4, so that the deceleration value is between 3 m/s$^2$ and 6 m/s$^2$, in step 26 in addition to LEDs 8.2 and 8.4, LED 8.5 is turned on in the same intensity as LEDs 8.2 and 8.4. As a result, the signal effect of the brake light is greater than at a deceleration value below 3 m/s$^2$.

The method after step 26 depending on the behavior of the driver of vehicle 7 can continue either with step 28, step 21, or step 27.

If the driver of vehicle 7 reduces the pressure on brake pedal 4, therefore in fact deceleration being continued, the deceleration value declines again below 3 m/s$^2$. In step 28 the same brake signature is then produced as in step 25. Therefore LED 8.5 is turned off, so that light is no longer emitted by lower emitting surface 6.5 of optical fiber 5.5. Therefore, as in step 25 the signature of the brake light is generated still only by partial emitting surface 6.2 and lower emitting surface 6.4.

If the driver of vehicle 7 completely removes the pressure from brake pedal 4, thus vehicle 7 no longer experiences any deceleration. Therefore, the taillight function from step 21 is restored and thus the method is started from the beginning.

Step 27 is begun when the driver of vehicle 7 steps so firmly on brake pedal 4 that the deceleration value rises above the value of 6 m/s$^2$. This is the case, e.g., in an emergency braking. LEDs 8.2, 8.4, and 8.5, which are turned on in step 27, are then controlled such that they give off a pulsating light emission. A signal effect is especially great as a result. Alternatively or in addition, the flashing light function of vehicle 7 can be turned on.

After step 27 the method can continue either with step 21 or step 29 depending on the behavior of the driver of vehicle 7.

Step 21 is started when the driver of vehicle 7 removes his foot from the brake pedal 4 and thus vehicle 7 experiences no further deceleration due to the braking force. The taillight function is turned on again.

Step 29 is started when the driver of vehicle 7 reduces the pressure on brake pedal 4, until the deceleration value again falls below the value of 6 m/s$^2$. The pulsating light emission of LEDs 8.2, 8.4, and 8.5 is turned off. If necessary, the hazard warning light function is also turned off. Either step 28 or step 21 now follows step 29.

Figure 3C:
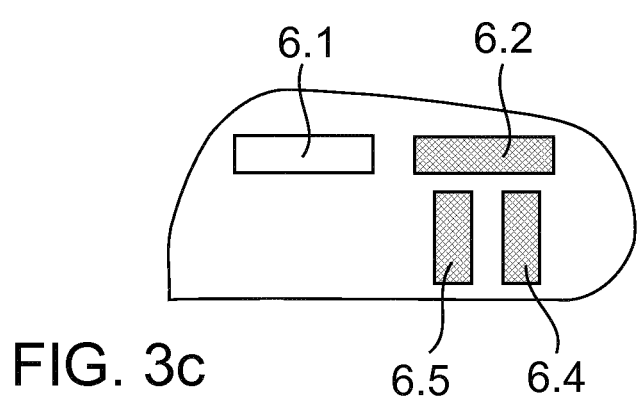
Figure 4:
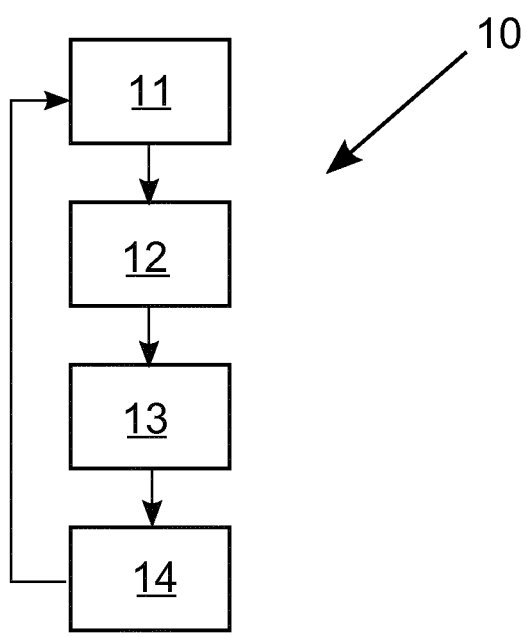
FIG. 4 shows a diagram of the process in an exemplary embodiment of the method of the invention.

If the detected deceleration value even at the beginning of the braking action is above the first deceleration value, step 25 of method 20 is skipped, and the signature in FIG. 3*c* is activated immediately.

If an emergency braking occurs at the beginning, the detected deceleration value even at the beginning of the braking action will therefore be above the second deceleration value. Then steps 25 and 26 of method 20 are skipped and a pulsating light emission is activated immediately.

A method of the invention naturally can also comprise only two levels. Level three of the method can be omitted, e.g., so that no pulsating light emission is activated during emergency braking. Alternatively, step 25 of method 20 can also be omitted in general.

Alternatively, partial emitting surface 6.3 can also be divided into more than two lower emitting surfaces, for example, into three lower emitting surfaces. Thus, for example, in level 1 a middle lower emitting surface and in the second level a right and left lower emitting surface together with the second partial emitting surface can then generate the second light function.

Another embodiment of rear light 2 is explained with reference to FIGS. 6*a* and 6*b*.

In this case, the decoupling surfaces of optical fibers 5 again serve as emitting surface 9 of rear light 2.

Rear light 2 is formed in two parts. The first part 15.1 is arranged, for example, on a movable part of the rear of a vehicle, for example, a trunk lid or a tailgate, and the second part 15.2 on a nonmovable part, for example, directly next to the trunk lid or tailgate.

The first part 15.1 comprises a plurality of partial emitting surfaces 9.1 to 9.3, which are illuminated, for example, by LEDs (not shown), as explained in the previous examples.

Partial emitting surface 9.2 is formed thereby such that it forms a u-shape in first part 15.1 and a line in part 15.2. The u-shape again comprises two substantially horizontal sections, running parallel to one another, and a substantially vertical section, running slightly diagonally from bottom to top, which connects the two sections running substantially horizontal to one another. The u-shape is therefore open to the side.

Partial emitting surface 9.1 in both parts 15.1 and 15.2 forms a substantially horizontal broad stripe. Said stripe can be formed, for example, by a plurality of lower emitting surfaces 9.1' and 9.13' arranged above one another. Partial emitting surface 9.3 is formed by lower emitting surfaces 9.3' and 9.13'. They form a vertical stripe.

Figure 6A:
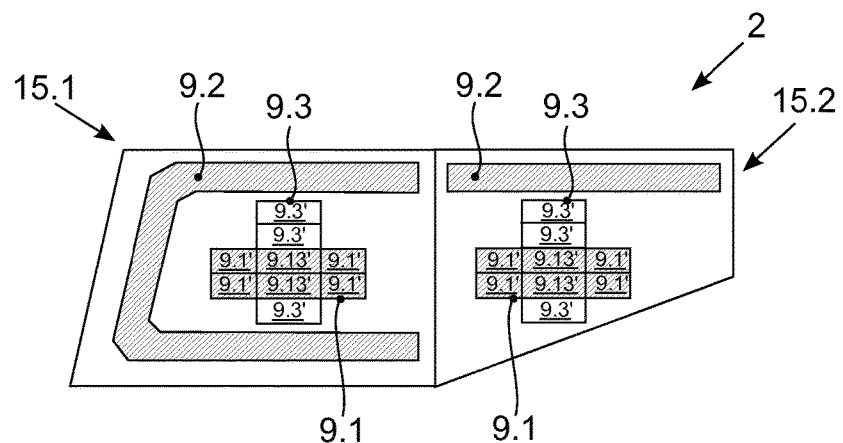
FIGS. 6a and 6b show an embodiment of the rear light and signatures that can be produced with this embodiment of the rear light.
Figure 6B:
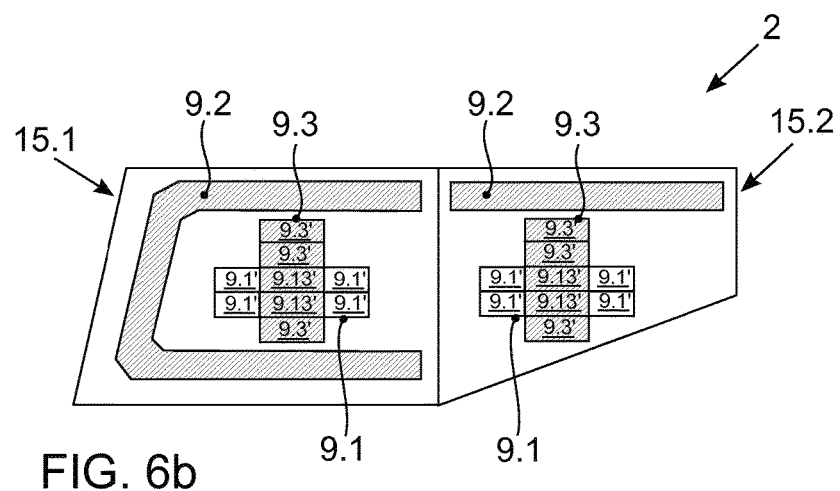

The two parts 15.1 and 15.2 of rear light 2 are operated simultaneously, so that rear light 2 generates the signatures of rear light 2 as shown in FIGS. 6*a* and 6*b*.

A signature of a taillight function is shown in FIG. 6*a*. In this case, light is emitted outwardly via partial emitting surfaces 9.1 and 9.2. Partial emitting surface 9.3 is not illuminated during operation of the taillight function. Partial emitting surface 9.1 furthermore comprises lower emitting surfaces 9.1' and 9.13'.

If the brake pedal activates a switchover process from the taillight function to the brake light function, a signature is generated, as shown in FIG. 6*b*. Lower emitting surfaces 9.1' of partial emitting surface 9.1 no longer emit any light. Lower emitting surfaces 9.13' continue to emit light, because they are also assigned to partial emitting surface 9.3. Moreover, lower emitting surfaces 9.3' emit light. The light intensity of lower emitting surfaces 9.13' and partial emitting surface 9.2 can then be adjusted to the light intensity of the additionally connected lower emitting surfaces 9.3'.

The brake light function is provided jointly by partial emitting surfaces 9.2 and 9.3.

Another embodiment of rear light 2 in the case of different light functions is explained with reference to FIGS. 7*a* to 7*c*.

In this case, decoupling surfaces of optical fibers 5 again serve as emitting surface 16 of rear light 2.

Rear light 2 is made as two parts, as in the embodiment of FIGS. 6*a* and 6*b*. The first part 15.1 is again arranged on a movable part of the rear of the vehicle, whereas part 15.2 is arranged on an unmovable part of the rear of the vehicle.

Partial emitting surfaces 16.1, 16.2, and 16.3 emit light in first part 15.1 and in second part 15.2 of rear light 2.

Partial emitting surface 16.2 is again formed u-shaped in first part 15.1 and as a line in second part 15.2.

A plurality of lower emitting surfaces 16' are arranged in first part 15.1 and second part 15.2 of rear light 2. These are arranged in eight rows and four columns slightly offset to one another. Partial emitting surfaces 16.2 and 16.3 can then be generated by any combinations of light-emitting lower emitting surfaces 16'.

In addition, two partial emitting surfaces 16.4 are arranged in second part 15.2 of rear light 2. These then emit light when a rear fog light function is turned on.

Figure 7A:
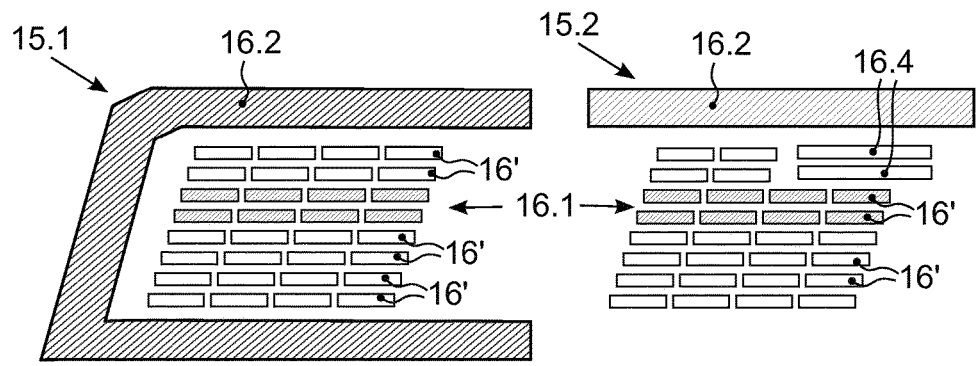
FIGS. 7a to 7c show an embodiment of the rear light and signatures that can be produced with this embodiment of the rear light.

FIG. 7*a* shows a taillight function that can be generated by rear light 2. The signature of the taillight function is generated, for example, in that partial emitting surface 16.2 emits light. Partial emitting surface 16.1 is generated in that lower emitting surfaces 16' of rows three and four in both parts 15.1 and 15.2 of rear light 2 emit light.

The signature of the taillight accordingly in first part 15.1 has a u-shape, formed by partial emitting surface 16.2 and two horizontal light lines, which are produced by partial emitting surface 16.1.

Figure 7B:
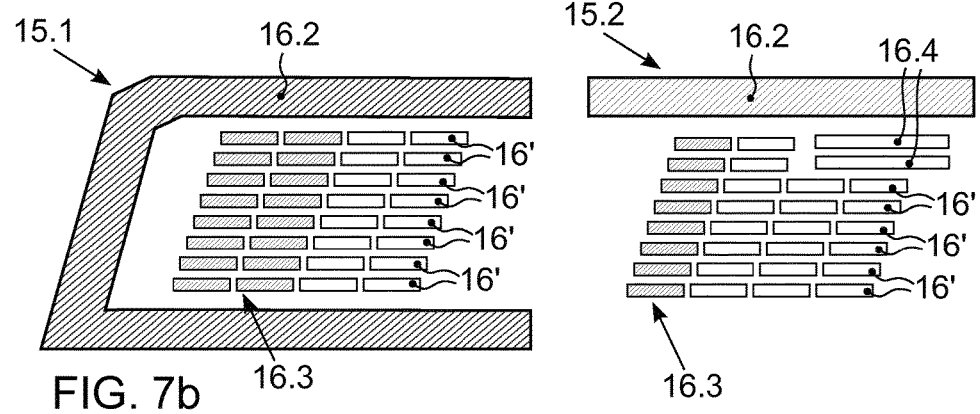

If a switchover process from the taillight function to the brake light function is brought about in response to the brake pedal, a signature is generated, as it is shown in FIG. 7*b*. Partial emitting surface 16.2 continues to emit light. In this case, the light intensity with which partial emitting surface 16.2 emits light can be adjusted according to the described method.

In first part 15.1 of rear light 2, the two horizontal light lines, produced by partial emitting surface 16.2, are no longer produced. Instead, partial emitting surface 16.3 emits light. Partial emitting surface 16.3 in first part 15.1 of rear light 2 includes lower emitting surfaces 16' of the first and second column from the left. Two light stripes running slightly diagonally from top to bottom are formed. Moreover, partial emitting surface 16.3, as in the previous example, is produced partially by the same lower emitting surfaces 16' as partial emitting surface 16.1.

In second part 15.2 of rear light 2 as well, the two horizontal light lines are no longer produced. Instead, partial emitting surface 16.3 emits light. Partial emitting surface 16.3 of second part 15.2 includes lower emitting surfaces 16' of only the first column from the left.

Figure 7C:
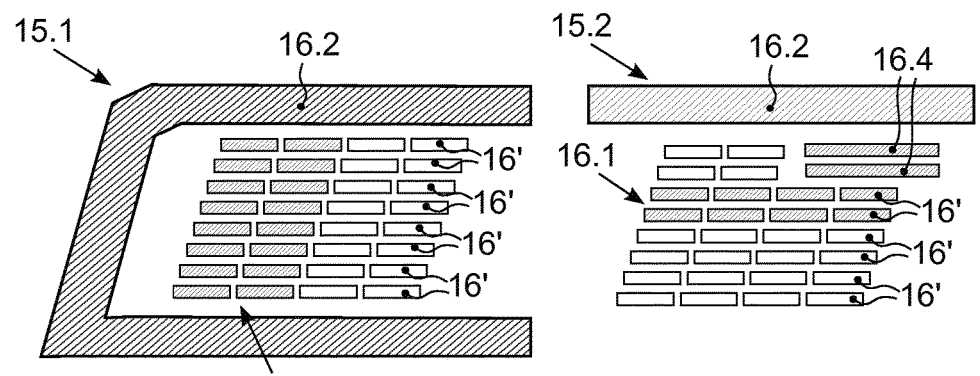

Alternatively, the signature of rear light 2 can also correspond to the signature shown in FIG. 7c. This signature corresponds to a combination of signatures of the taillight function and brake light function of FIGS. 7a and 7b. The taillight function is thereby not completely turned off. Rather, the signature of the taillight function from second part 15.2 of rear light 2, as it is shown in FIG. 7a, is retained. First part 15.1 of rear light 2 has the signature of the brake light function, as it is shown in first part 15.1 of rear light 2 in FIG. 7b. In this case, the light intensities of partial emitting surfaces 16.1 and 16.2 of the taillight function can be changed in turn.

If the rear fog light function is turned on, partial emitting surfaces 16.4 as well emit light. This is also shown in FIG. 7c.

In the present example, not all lower emitting surfaces 16' installed in the rear light are used for generating the signatures. These unused lower emitting surfaces 16' can be used, for example, for other light functions. Alternatively, rear light 2 can have lower emitting surfaces 16' in the quantity and arrangement necessary for generating the desired signatures. For the example of FIGS. 7a to 7c, this means that the rear light has only lower emitting surfaces 16', which are involved in generating the signature of the taillight function shown in FIG. 7a, the signature of the brake light function shown in FIG. 7b, or the combination of taillight and brake light functions and the rear fog light function of FIG. 7c.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling a light emission of a rear light of a vehicle, the method comprising:
    providing the rear light with optical components having emitting surfaces with at least three partial emitting surfaces; and
    generating at least a first and a second light function via the light emission of the emitting surfaces, wherein, after a switchover process from the first to the second light function, a first partial emitting surface, which emits light for the first light function, no longer emits light, a second partial emitting surface, which emits light for the first light function, continues to emit light, and a third partial emitting surface, which does not emit light for the first light function, emits light,
    wherein the first light function is a taillight function and the second light function is a braking light function.

2. The method according to claim 1, wherein the partial emitting surfaces are formed in a shape of lines, wherein the lines of the first and second partial emitting surfaces are substantially perpendicular to the third partial emitting surface.

3. The method according to claim 2, wherein substantially horizontal light lines are produced by the first and second partial emitting surface and a substantially vertical light line is produced by the third partial emitting surface.

4. The method according to claim 3, wherein at least the horizontal light lines produced by the first partial emitting surface are produced by lower emitting surfaces arranged next to one another, and/or the vertical light line of the third partial emitting surface is produced by lower emitting surfaces arranged below one another.

5. The method according to claim 1, wherein the first partial emitting surface is produced by a first set of lower emitting surfaces and the third partial emitting surface is produced by a second set of lower emitting surfaces, wherein at least one lower emitting surface is a subset of the first and second set of lower emitting surfaces.

6. The method according to claim 1, wherein three light lines are produced by at least one part of the second partial emitting surface, wherein the three light lines are arranged such that the one part of the second partial emitting surface produces a u-shaped light emission.

7. The method according to claim 1, wherein the switchover process is carried out as a function of a signal, and an intensity of the light emission via the second partial emitting surface is increased as a function of the signal, wherein the intensity of the light emission of the second partial emitting surface is precisely as great as the intensity of the light emission by the third partial emitting surface.

8. The method according to claim 7, wherein the signal is assigned to a deceleration of the vehicle caused by a braking action.

9. The method according to claim 8, wherein
    the third partial emitting surface comprises at least two lower emitting surfaces,
    the second light function is divided into two levels as a function of the deceleration of the vehicle,
    when the first level is reached, the second light function is generated by the second partial emitting surface and the first lower emitting surface of the third partial emitting surface, and
    when the second level is reached, the second light function is additionally generated by the second lower emitting surface of the third partial emitting surface so that the second light function is generated jointly by the second partial emitting surface and the first and second lower emitting surface of the third partial emitting surface.

10. The method according to claim 9, wherein the second light function is divided into three levels as a function of the deceleration, wherein, when the third level is reached, the optical components are controlled such that a pulsating light is emitted by the second partial emitting surface and by the first and second lower emitting surface of the third partial emitting surface and/or a hazard warning light function of the vehicle is turned on.

11. A device for controlling a light emission of a rear light of a vehicle, the rear light comprising optical components having emitting surfaces with at least three partial emitting surfaces, and at least a first and a second light function being generated by the light emission of the emitting surfaces, the device comprising a control device via which the light emission by the partial emitting surfaces are controllable, the optical components being controlled by the control device such that after a switchover process from the first to the second light function, a first partial emitting surface, which emits light for the first light function, no longer emits light, a second partial emitting surface, which emits light for the first light function, continues to emit light, and a third partial emitting surface, which does not emit light for the first light function, emits light,
    wherein the first light function is a taillight function and the second light function is a braking light function.

12. The device according to claim 11, wherein the optical components comprise LEDs.

13. A vehicle with a device according to claim 11.

* * * * *